(12) United States Patent
Huber et al.

(10) Patent No.: US 12,539,908 B2
(45) Date of Patent: Feb. 3, 2026

(54) ADJUSTMENT DRIVE FOR A STEERING COLUMN, AND STEERING COLUMN FOR A MOTOR VEHICLE

(71) Applicants: thyssenkrupp Presta AG, Eschen (LI); thyssenkrupp AG, Essen (DE)

(72) Inventors: Sebastian Huber, Goefis (AT); Jean-Pierre Specht, Haag (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 168 days.

(21) Appl. No.: 17/916,435

(22) PCT Filed: Apr. 1, 2021

(86) PCT No.: PCT/EP2021/058562
§ 371 (c)(1),
(2) Date: Sep. 30, 2022

(87) PCT Pub. No.: WO2021/204645
PCT Pub. Date: Oct. 14, 2021

(65) Prior Publication Data
US 2023/0150566 A1 May 18, 2023

(30) Foreign Application Priority Data
Apr. 7, 2020 (DE) ...................... 10 2020 204 473.2

(51) Int. Cl.
*F16H 25/20* (2006.01)
*B62D 1/181* (2006.01)
(Continued)

(52) U.S. Cl.
CPC ............ *B62D 1/185* (2013.01); *B62D 1/181* (2013.01); *B62D 5/043* (2013.01); *B62D 5/0439* (2013.01);
(Continued)

(58) Field of Classification Search
CPC ........ B62D 1/181; B62D 1/185; B62D 5/043; B62D 5/0439; F16D 7/027; F16H 25/2021; F16H 2025/2071
See application file for complete search history.

(56) References Cited

U.S. PATENT DOCUMENTS

| 4,739,673 A * | 4/1988 | Ishikawa ................ B62D 1/181 74/411 |
| 2010/0001125 A1 * | 1/2010 | Cavalier ............. F16H 25/2454 244/99.3 |

(Continued)

FOREIGN PATENT DOCUMENTS

| CN | 103129602 A | 6/2013 |
| CN | 110267864 A | 9/2019 |

(Continued)

OTHER PUBLICATIONS

English Translation of International Search Report issued in PCT/EP2021/058562, dated Jun. 30, 2021.

*Primary Examiner* — Minnah L Seoh
*Assistant Examiner* — Gregory T Prather
(74) *Attorney, Agent, or Firm* — thyssenkrupp North America, LLC

(57) ABSTRACT

An adjustment drive can be used in a steering column for a motor vehicle. In some examples, the adjustment drive may include a threaded spindle that engages with an outer thread in a spindle nut and a drive unit that is coupled to the threaded spindle or the spindle nut in such a manner that the threaded spindle and the spindle nut can be driven in rotation relative to each other. The drive unit may have a torque-transmitting slip clutch that is coupled to the threaded spindle or the spindle nut. The slip clutch may include friction faces that contact each other in a frictionally engaging manner.

20 Claims, 3 Drawing Sheets

(51) Int. Cl.
  *B62D 1/185*  (2006.01)
  *B62D 5/04*   (2006.01)
  *F16D 7/02*   (2006.01)

(52) U.S. Cl.
  CPC ......... *F16D 7/027* (2013.01); *F16H 25/2021* (2013.01); *F16H 2025/2071* (2013.01); *F16H 2025/2084* (2013.01); *F16H 2025/209* (2013.01)

(56) References Cited

U.S. PATENT DOCUMENTS

| | | |
|---|---|---|
| 2013/0126259 A1 | 5/2013 | Jung et al. |
| 2015/0376929 A1* | 12/2015 | Scheuring ............... F16D 43/21 74/89.38 |
| 2017/0361863 A1* | 12/2017 | Rouleau ................ B62D 1/195 |
| 2019/0257366 A1 | 8/2019 | Khale et al. |
| 2019/0367071 A1 | 12/2019 | Schacht et al. |

FOREIGN PATENT DOCUMENTS

| | | | |
|---|---|---|---|
| DE | 10 2012 112 197 A1 | 6/2014 | |
| DE | 10 2014 101 995 A1 | 1/2015 | |
| DE | 10 2017 207 561 A1 | 7/2017 | |
| DE | 112017005119 T5 | 6/2019 | |
| DE | 102018215188 A1 | 3/2020 | |
| WO | WO-2018138044 A1 * | 8/2018 | ............. B62D 1/181 |
| WO | 2019145281 A1 | 8/2019 | |

* cited by examiner

ADJUSTMENT DRIVE FOR A STEERING COLUMN, AND STEERING COLUMN FOR A MOTOR VEHICLE

CROSS REFERENCE TO RELATED APPLICATIONS

This application is a U.S. National Stage Entry of International Patent Application Serial Number PCT/EP2021/058562, filed Apr. 1, 2021, which claims priority to German Patent Application No. DE 10 2020 204 473.2, filed Apr. 7, 2020, the entire contents of which are incorporated herein by reference.

FIELD

The present disclosure generally relates to steering columns, including adjustment drives for steering columns.

BACKGROUND

Steering columns for motor vehicles have a steering shaft having a steering spindle, at the rear end of which facing the driver in the direction of travel a steering wheel is fitted in order for the driver to introduce a steering command. The steering spindle is rotatably supported about the longitudinal axis thereof in an adjustment unit which is retained by means of a carrier unit on the vehicle body. As a result of the fact that an inner covering pipe of the adjustment unit, also referred to a covering pipe for short, is received in a covering unit which is connected to the carrier unit and which is also referred to as a guiding case, outer covering pipe or boxed rocker so as to be able to be displaced in the manner of a telescope in the direction of the longitudinal axis, a length adjustment can be carried out. A height adjustment can be carried out by the adjustment unit or a covering unit which receives it being pivotably supported on the carrier unit. The adjustment of the adjustment unit in the longitudinal or vertical direction enables the adjustment of an ergonomically comfortable steering wheel position relative to the driver position in the operational position, also referred to as the driving or operating position, in which a manual steering action can be carried out.

It is known in the prior art, in order to adjust the adjustment unit relative to the carrier unit, to provide a motorized adjustment drive with a drive unit. The drive unit comprises an electric drive motor which—generally by means of a gear mechanism—is connected to a spindle drive which comprises a threaded spindle which is screwed into a spindle nut. As a result of the drive unit, the threaded spindle and the spindle nut can be rotatably driven with respect to each other about the spindle axis, whereby, depending on the rotation direction, they can be moved in translation toward each other or away from each other in the direction of the spindle axis. In an embodiment, a so-called rotary spindle drive, the threaded spindle can be rotatably driven about the spindle axis by means of the drive unit which is fixedly connected to the adjustment unit or the carrier unit and engages in the spindle nut, which is fitted in a fixed manner to the carrier unit or the adjustment unit with respect to rotation about the spindle axis. Axially, that is to say, in the direction of the spindle axis, the threaded spindle is supported by means of the coupling portion on the carrier unit or the adjustment unit, and the spindle nut is accordingly supported on the adjustment unit or the carrier unit so that a rotary drive of the threaded spindle brings about a translational adjustment of the carrier unit and adjustment unit relative to each other.

In an alternative embodiment, which is also referred to as an immersion spindle drive, the threaded spindle is coupled to the carrier unit or the adjustment unit with the coupling portion thereof in a non-rotatable manner with respect to rotation about the spindle axis thereof and the spindle nut is accordingly supported on the adjustment unit or the carrier unit so as to be able to be rotated but in a state fixed in the direction of the spindle axis. As in the first embodiment, the threaded spindle is supported by means of the coupling portion in the direction of the spindle axis axially on the carrier unit or the adjustment unit, and the spindle nut is accordingly supported on the adjustment unit or the carrier unit so that the threaded spindle can be displaced in a translational manner by the drive unit in the direction of the spindle axis.

In both embodiments, the spindle drive forms a motorized adjustment drive which is active between the carrier unit and adjustment unit and by means of which the adjustment unit can be displaced for adjustment relative to the carrier unit. A generic adjustment drive is described, for example, in DE 10 2017 207 561 A1.

In order to carry out a longitudinal adjustment of the adjustment unit in the direction of the longitudinal axis of the steering spindle, an adjustment drive can be arranged between the covering pipe of the adjustment unit and a covering unit which receives it in an axially longitudinally displaceable manner and which is connected to the carrier unit and wherein the spindle axis can be orientated substantially parallel with the longitudinal axis.

For height adjustment, an adjustment device may be arranged between the carrier unit and an adjustment unit which is supported thereon so as to be able to be vertically adjusted.

A motorized longitudinal and vertical adjustment can be formed individually or in combination on the steering column.

In order to improve the comfort when entering and leaving or in order to adjust the steering column into a storage position outside the manual operating range when moving into the autonomous driving mode during autonomous driving or to bring it back into the operating position from the storage position when changing into manual operation, a relatively rapid adjustment over relatively large adjustment paths is required. In this instance, collisions of the rapidly moved steering wheel with vehicle occupants may occur and injuries may result. A reduction of the adjustment speed in order to reduce the risk of injury is, however, not acceptable as a result of the associated comfort losses and also as a result of potential safety risks during autonomous driving.

Thus a need exists for an adjustment drive with a higher safety level.

DETAILED DESCRIPTION

Figure 1:
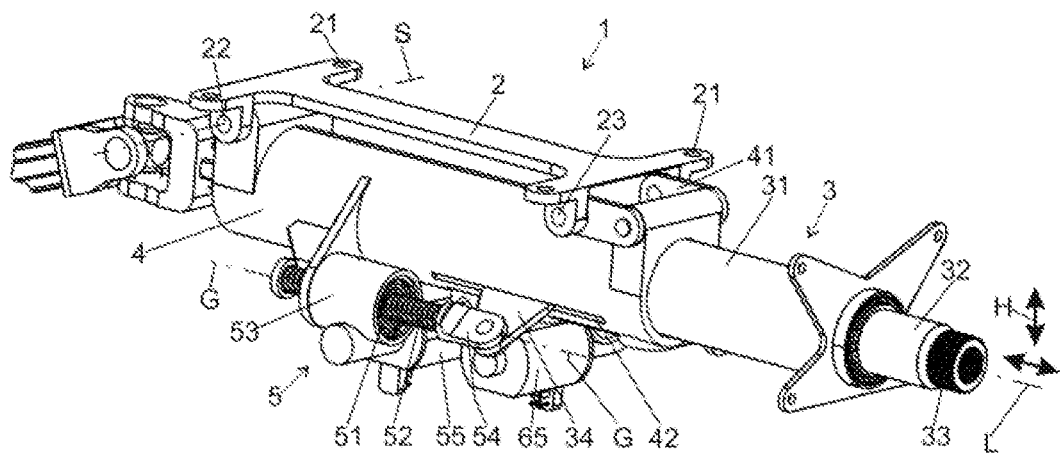
FIG. 1 is a schematic, perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In an adjustment drive for a steering column for a motor vehicle comprising a threaded spindle which engages with an outer thread in a spindle nut and a drive unit which is coupled to the threaded spindle or the spindle nut in such a manner that the threaded spindle and the spindle nut can be driven in rotation relative to each other, there is provision according to the invention for the drive unit to have a torque-transmitting slip clutch which is coupled to the threaded spindle or the spindle nut.

A slip clutch, which can also be synonymously referred to as a friction clutch, has friction faces which are connected to each other in a non-positive-locking or frictionally engaging manner and which are arranged on rotatably drivable drive elements by means of which the drive torque produced by an electric motor (drive motor) is coupled to the threaded spindle or the spindle nut. The slip clutch consequently forms a rotating clutch which is incorporated in the force or torque path between the motor which generates the drive torque and the spindle nut which is rotatably driven thereby or the threaded spindle.

As a result of the fact that the friction faces of the slip clutch are loaded with respect to each other with a predetermined coupling force, there is produced a defined friction force (adhesive force) by means of which a maximum drive torque or maximum torque is predetermined. If the drive torque applied exceeds this maximum drive torque, the friction faces slide through relative to each other since the effective static friction is exceeded and the torque transmission is interrupted. The adjustment is thereby stopped.

During normal operation of an adjustment drive, when the adjustable elements of the steering column can move relative to each other in an unimpeded manner, the drive torque which is introduced into the spindle drive, that is to say, by the motor into the spindle nut or the threaded spindle of the spindle drive, remains below the limit value predetermined by the maximum drive torque. The limit value is determined from the effective normal force which acts on friction faces and the static friction coefficient, that is to say, the borderline case represents the transition from static friction to sliding friction. However, if there is an obstacle in the adjustment path during adjustment, for example, if the steering wheel strikes a vehicle occupant, the drive torque increases. If, in this instance, the maximum drive torque of the slip clutch is exceeded, it slips through and the transmission of the drive torque is interrupted so that the adjustment is stopped. As a result of corresponding specification of the maximum drive force, a maximum permissible adjustment force is predetermined and the strength of the impact in the event of a collision with objects or vehicle occupants in the vehicle interior is thereby limited. The risk of injuries and damage is reduced and the safety level is increased. In this instance, it is advantageous for a high adjustment speed to continue to be maintained in order to ensure a high level of travel and operating comfort.

Preferably, the slip clutch is in the form of a dry clutch. As a result of this embodiment, the use of fluids can be prevented. In particular, a sealing of the slip clutch with respect to the environment can thereby be dispensed with.

Preferably, there may be provision for a motor of the drive unit to be coupled to the slip clutch. The drive torque is produced by the motor of the drive unit, preferably an electric drive motor, which is connected at the input side or drive side to the slip clutch, preferably by means of a gear mechanism. At the outlet or output side, in order to drive the spindle drive, the slip clutch is connected to the threaded spindle or the spindle nut, that is to say, consequently coupled. Consequently, the slip clutch is according to the invention incorporated in the drive train in order to transmit the drive torque between the motor and the spindle drive.

It is advantageous for the slip clutch to have at least two friction faces which contact each other in a frictionally engaging manner. These two friction faces which contact each other in a frictionally engaging manner form a friction pair. A friction clutch which has on rotating clutch components corresponding coupling faces which lie against each other in a non-positive-locking manner and which are in the form of friction faces is thereby formed. The friction faces may be opposite each other with respect to the rotation or coupling axis of the slip clutch axially, radially or obliquely. Such embodiments may be produced in a structurally simple and space-saving manner.

Preferably, the slip clutch has one or more friction pairs. In a very particularly preferred manner, the slip clutch has two friction pairs.

There may be provision for at least one of the friction faces to be configured in a friction-increasing manner. In order to produce a defined friction and a corresponding maximum torque, one or both friction faces may have a clutch lining or friction lining which may have a friction material, such as, for example, sintering materials, carbon fiber compound and/or ceramic materials which can be bound in a binding agent, such as synthetic resin or the like. It is thereby advantageously possible to carry out an optimized adaptation to the materials of the slip clutch, the response behavior and the desired transmission characteristic, the structural space available and the like.

It is possible for the friction faces to be formed or arranged on torque-transmitting coupling components and to be directly in abutment with each other. In addition, one or more friction elements may be arranged between friction faces, for example, friction or coupling plates which are supported in a floating manner and which are coupled only in a non-positive-locking manner in the torque path. In this instance, it is possible for a friction element to be configured in a friction-increasing manner, for example, with a friction liner, as set out above, or a friction element may be inserted in place of a friction liner between the friction faces and may, for example, be formed as a type of friction plate from an above-mentioned friction material.

With one or more interposed friction elements, a packet-like arrangement, as in multi-disk clutches known per se may be produced.

There may be provision for the slip clutch to have a pretensioning device, Using the pretensioning device, the friction faces may be loaded with respect to each other with a defined pretensioning force, the normal force. As a result of the level of the pretensioning force, the maximum drive torque may be predetermined and accordingly the adjustment force applied by the adjustment drive.

It may be advantageous for the pretensioning device to have a resilient element and/or an adjustable adjustment means. There may be provided as a resilient element, for example, a spring element which presses the friction faces resiliently one against the other. The level of the resilient force determines the pretensioning. In this instance, it is advantageous that tolerances are compensated for by the resilient force, whereby safe operation is ensured.

The adjustable adjustment means may be provided alternatively to or together with a resilient element and enables the adjustment and variable adaptation of the pretensioning force. There may, for example, be provided as an adjustment means an adjustment screw which can be tensioned with respect to a friction face in order to produce the pretensioning force of the non-positive-locking engagement at a defined level. Consequently, the response of the slip clutch, that is to say, the slipping through of the friction faces in order to interrupt the drive torque, can be adjusted in order to predetermine the maximum permissible adjustment force.

The combination of a resilient element with an adjustment means, for example, a pressure spring or spring plate, which can be inserted between an adjustment screw and a coupling component which has a friction face is advantageous. As a result of the fact that the adjustment screw is tensioned against the resilient element, the pretensioning force can be finely adjusted and can be introduced in a resiliently homogenized manner into the frictional engagement. This may be carried out, for example, during the assembly of the adjustment drive by the adjustment screw being rotated until the permissible adjustment force is reached.

Subsequently, there may additionally be provision for the adjustment screw to be fixed, for example, by means of caulking.

An advantageous embodiment may make provision for the slip clutch to be arranged coaxially with respect to the threaded spindle. As a result of an arrangement coaxially relative to the spindle axis of the threaded spindle, a particularly compact construction type can be achieved. Annular friction faces which completely or partially surround the threaded spindle may preferably be formed. The friction faces may have axial surfaces which can preferably be loaded with respect to each other by means of a pretensioning device in the direction of the spindle axis in order to predetermine a defined maximum drive torque. In this instance, at least one of the friction faces may be fitted or formed on the threaded spindle or the spindle nut. The drive torque which is directly applied to the spindle drive is thereby relevant for the response of the slip clutch so that the maximum drive torque cannot be impaired by means of friction at another location or the like.

An advantageous embodiment of the invention may make provision for the slip clutch to be connected to a gear wheel. The gear wheel is a gear element in the drive train between the motor and the threaded spindle or the spindle nut, for example, a gear, worm gear or the like. As a result of the connection to a gear wheel, the structural integration of the slip clutch into a gear mechanism of the drive unit can be improved and simplified.

In the last-mentioned embodiment, there may advantageously be provision for a rotationally drivable drive wheel of the drive unit to be in meshing engagement with the gear wheel. A worm which is connected to the motor and which engages in a gear wheel which is in the form of a worm gear may, for example, act as a drive wheel.

It is advantageously possible for the gear wheel to be connected to the spindle nut or the threaded spindle. The gear wheel may, for example, comprise a gear or a worm gear which is connected coaxially to the spindle nut in order to produce an immersion spindle drive in which the threaded spindle which is fixed with respect to rotation about the spindle axis passes coaxially through the spindle nut and the gear wheel. Alternatively, the gear wheel may be connected to the threaded spindle in order to form a rotation spindle drive in which the threaded spindle can be driven by the drive unit in a rotational manner relative to the steering column.

An advantageous development of the above-mentioned embodiment is that the slip clutch is integrated between a sprocket and a hub of the gear wheel. As a result, the slip clutch can advantageously be integrated in a particularly compact manner in the gear wheel, for example, a worm gear. In this instance, the hub may have at least one axial or radial friction face, preferably on the outer circumference thereof. The sprocket which is arranged coaxially with respect to the hub and which may, for example, have an externally circumferential worm gear arrangement has at least one corresponding friction face.

In an immersion spindle drive, the hub may have the inner thread of the spindle nut which may be integrally constructed with the hub, or in a threaded bush inserted into the hub. In a rotary spindle drive, the hub may be connected to the threaded spindle in a rotationally secure manner by means of a fixed connection or by means of integral construction.

It may be advantageous for the hub and the sprocket to have mutually opposing friction faces which are preferably directed axially counter to each other. The torque-transmitting frictional engagement may thereby be integrated in the gear wheel in a compact manner. An advantage of friction faces which are arranged axially with respect to the spindle axis is that a pretensioning device, which may, for example, comprise an adjustment screw and additionally or alternatively a resilient element, can be arranged axially with respect to the friction faces, whereby a production even with a relatively small diameter of the gear wheel is readily possible. An arrangement similar to that in a known construction type of a disk clutch with circular friction faces can be formed.

The integration of the slip clutch in the gearwheel is advantageous in many respects. A particularly compact construction type can thereby be achieved and a direct coupling to the threaded spindle or the spindle nut is enabled, whereby the response behavior of the adjustment drive is improved. It is further advantageous for the hub and the sprocket to be able to be constructed from different materials, for example, from steel, non-iron metals, or plastics materials, composite materials or the like.

Furthermore, the invention relates to a steering column for a motor vehicle, having a carrier unit which can be fitted to a vehicle body, and by means of which an adjustment unit in which a steering spindle is rotatably supported is retained, and having an adjustment drive which comprises a threaded spindle which engages with an outer thread in a spindle nut, and a drive unit which is coupled to the threaded spindle or the spindle nut in such a manner that the threaded spindle and the spindle nut can be driven so as to rotate relative to each other, wherein the adjustment drive is connected to the carrier unit or the adjustment unit, wherein the adjustment drive is in the form of an adjustment drive according to the invention. This drive may also have the above-mentioned advantageous developments individually or in combination.

Figure 2:
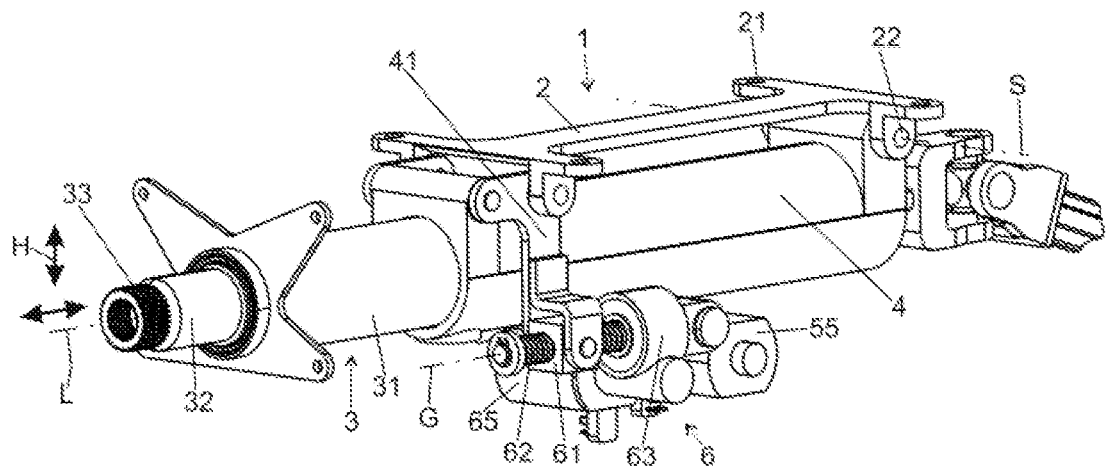
FIG. 2 is a further schematic, perspective view of the steering column according to FIG. 1 from another viewing angle.

FIG. 1 shows a steering column 1 according to the invention as an oblique schematic perspective view from the top right toward the rear end, with respect to the travel direction of a vehicle which is not illustrated, wherein a steering wheel which is not illustrated in this instance is retained in the operating region. FIG. 2 shows the steering column 1 as a view from the opposing side, that is to say, when viewed from the top right.

The steering column 1 comprises a carrier unit 2 which is in the form of a console, which has securing means 21 in the form of securing holes for fitting to a vehicle body which is not illustrated. The carrier unit 2 retains an adjustment unit 3 which is received in a covering unit 4—which is also referred to as a guiding box or a boxed rocker.

The adjustment unit 3 has a covering pipe 31 in which there is rotatably supported about a longitudinal axis L a steering spindle 32 which extends axially in the longitudinal direction, that is to say, in the direction of the longitudinal axis L. At the rear end, there is formed on the steering spindle 32 a securing portion 33 to which a steering wheel which is not illustrated can be fitted.

In order to produce a longitudinal adjustment in the covering unit 4, the adjustment unit 3 is received so as to be able to be displaced in the manner of a telescope in the direction of the longitudinal axis L in order to be able to position the steering wheel which is connected to the steering spindle 32 relative to the carrier unit 2 back and forth in the longitudinal direction, as indicated with the double-headed arrow parallel with the longitudinal axis L.

The covering unit 4 is supported in a pivot bearing 22 on the carrier unit 2 so as to be able to be pivoted about a horizontal pivot axis S which is located transversely with respect to the longitudinal axis L. In the rear region, the covering unit 4 is connected to the carrier unit 2 by means of an adjustment lever 41. As a result of a rotational movement of the adjustment lever 41 by means of an adjustment drive 6 which is not illustrated (see FIG. 2), the covering unit 4 can be pivoted relative to the carrier unit 2 about the pivot axis S which is located horizontally in the installation state, whereby an adjustment of a steering wheel which is fitted to the securing portion 33 can be carried out in the vertical direction H, which is indicated with the double-headed arrow.

A first adjustment drive 5 for longitudinal displacement of the adjustment unit 3 relative to the covering unit 4 in the direction of the longitudinal axis L has a spindle drive having a spindle nut 51 having an inner thread 74 which extends along an axis G and in which a threaded spindle 52 engages, that is to say, is screwed with the outer thread thereof into the corresponding inner thread 74 of the spindle nut 51. The threaded spindle axis of the threaded spindle 52 is identical to the axis G and extends substantially parallel with the longitudinal axis L.

The spindle nut 51 is rotatably supported about the axis G in a bearing housing 53 which is securely connected to the covering unit 4. In the direction of the axis G, the spindle nut 51 is axially supported on the covering unit 4 by means of the bearing housing 53. The adjustment drive 5 is accordingly a so-called immersion spindle drive.

The threaded spindle 52 is connected to the adjustment unit 3 with a securing element 54 which is formed at the rear end thereof by means of a transmission element 34, in a manner fixed in the direction of the axis G or the longitudinal axis L and fixed in position with respect to the rotation about the axis G. As a result of the rotationally drivable spindle nut 51 and the threaded spindle 52 which is fixed with respect to rotation, a so-called immersion spindle drive is produced.

The transmission element 34 extends from the adjustment unit 3 through a slot-like through-opening 42 in the covering unit 4. In order to adjust the steering column 1 in the longitudinal direction, the transmission element 34 can be moved freely along in the through-opening 42 in the longitudinal direction.

The adjustment drive 5 has an electric drive motor 55 by means of which the spindle nut 51 can be driven in rotation with respect to the axis G relative to the fixed threaded spindle 52. As a result—depending on the rotation direction of the drive motor 55—the threaded spindle 52 can be displaced in the direction of the axis G in translation relative to the spindle nut 51 so that the adjustment unit 31 which is connected to the threaded spindle 52 is accordingly displaced relative to the covering unit 4 which is connected to the spindle nut 51 in the direction of the longitudinal axis L. The drive of the spindle nut 51 and the support of the spindle nut 51 in the direction of the axis G on the covering unit 4 is explained in detail below.

In FIG. 2, which shows a perspective view of the steering column 1 from the side located at the rear in FIG. 1, it can be seen how a second adjustment drive 6 for adjusting in the vertical direction H is fitted to the steering column 1. This adjustment drive 6 comprises a spindle nut 61 in whose inner thread 74 a threaded spindle 52 engages along an axis G. The threaded spindle 52 is rotatably supported about the axis G in a bearing housing 63 which is secured to the covering unit 4 and axially supported on the covering unit 4 in the direction of the axis G and can be driven in rotation about the axis G by an electric drive motor 65 selectively in both rotation directions. Accordingly, the adjustment drive 6 is a so-called rotary spindle drive.

The spindle nut 61 which may be formed from plastics material or a non-ferrous heavy metal such as brass or the like, is fitted in a fixed manner with respect to a rotation about the axis G to one end of the two-armed adjustment lever 41 which is pivotably supported about a pivot bearing 23 on the carrier unit 2 and whose other arm is connected with the other end to the covering unit 4.

By rotating the threaded spindle 61—depending on the rotation direction of the drive motor 65—the spindle nut 61 can be displaced in translation relative to the threaded spindle 52 in the direction of the axis G so that the covering unit 4 which is connected to the spindle nut 61 by means of the adjustment lever 41 together with the adjustment device 3 which is received therein can accordingly be adjusted upward or downward in a vertical direction H relative to the carrier unit 2, as indicated with the double-headed arrow.

Figure 3:
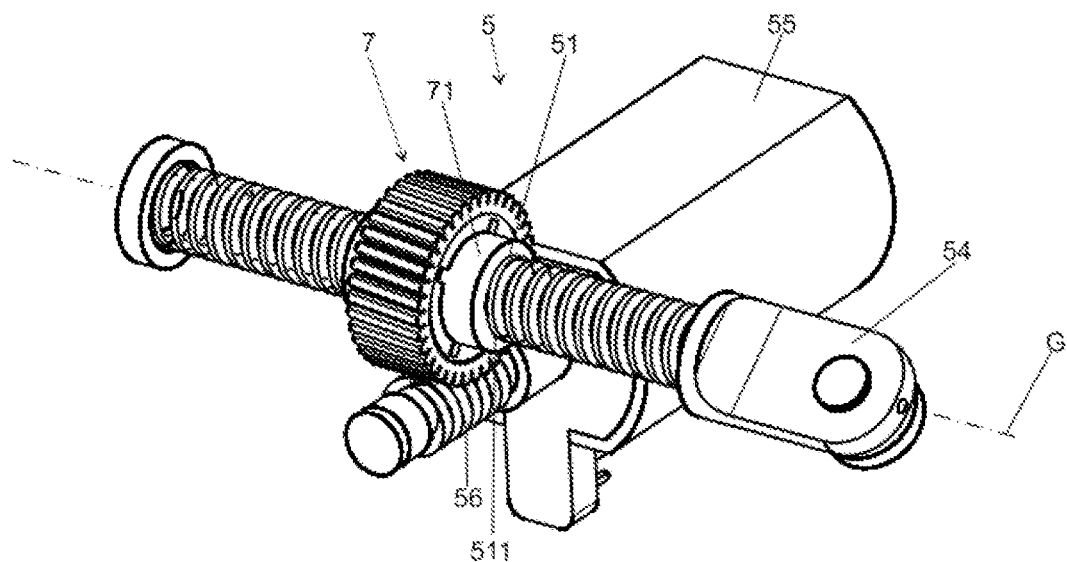
FIG. 3 is a cutaway schematic view of an example adjustment drive of a steering column according to FIGS. 1 and 2.
Figure 5:
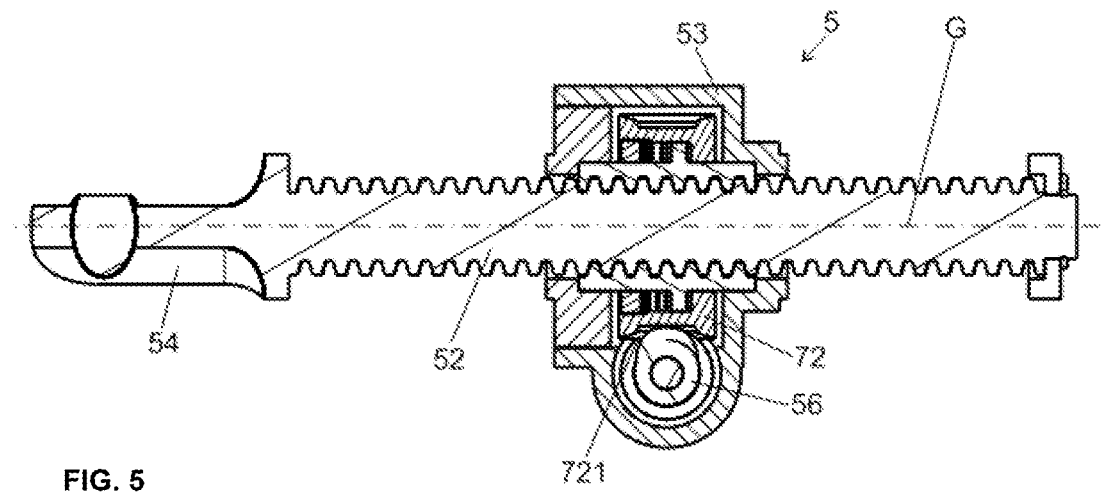
FIG. 5 is a longitudinal, sectional view along a spindle axis through the adjustment drive according to FIG. 3.
Figure 6:
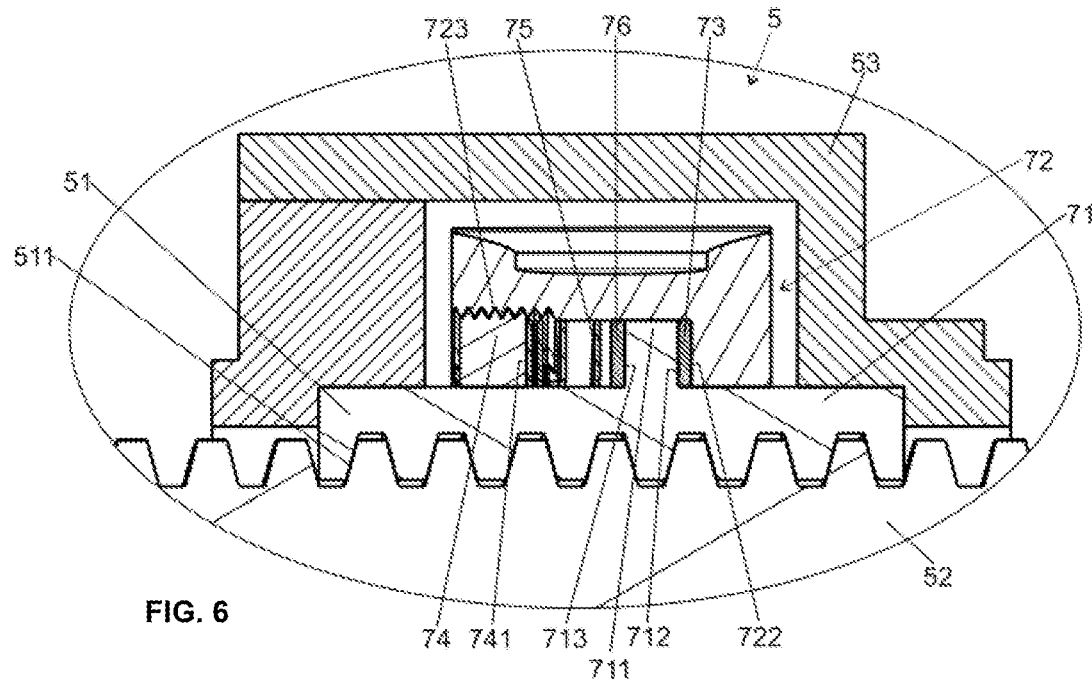
FIG. 6 is an enlarged detailed view from FIG. 5.

FIG. 3 shows the adjustment drive 5 which is in the form of an immersion spindle drive as a separate cut-away illustration, wherein the bearing housing 53 has been omitted for greater clarity. FIG. 5 shows a longitudinal section along the spindle axis G and FIG. 6 shows an enlarged detailed view therefrom.

The adjustment drive 5 has a gear wheel 7 which comprises a hub element 71 (=hub) which has the spindle nut 51 with the inner thread 511 and which is arranged in this instance coaxially with respect to the spindle axis G. The spindle nut 51 and the hub element 71 may preferably be constructed integrally as illustrated. However, it is also conceivable and possible for the spindle nut 51 to be formed from a metal material and for the hub element 72 which may be formed from a plastics material to be injected thereon with the plastics material injection-molding method.

A sprocket 72 having an externally circumferential tooth arrangement 721 is arranged coaxially with respect to the hub element 71 and connected by means of a slip clutch 8 according to the invention which will be explained in greater detail below.

A worm 56 which is connected to the motor shaft of the motor 55 is in toothed engagement with the tooth arrangement 721 of the sprocket 72.

Figure 4:
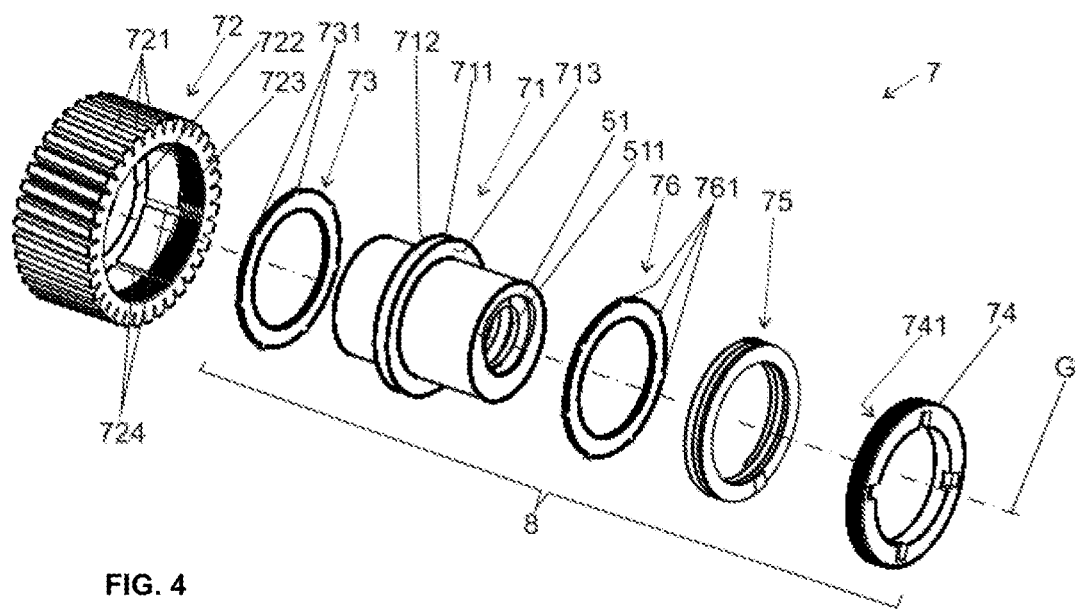
FIG. 4 is an exploded view of an example gear wheel of an adjustment drive.

The slip clutch 8 according to the invention which is integrated in the gear wheel 7 is shown in the assembled state in FIGS. 5 and 6 and as an exploded illustration pulled apart in the direction of the spindle axis G in FIG. 4.

The hub element 71 has a radially circumferential projection 711 which has at the axial sides thereof annularly circumferential axial friction faces 712 and 713. The friction faces 712 and 713 are consequently formed by the shoulders of the circumferential projection 711. In the installed state, the friction face 712 is axially opposite a corresponding, similarly annular axial friction face 722 internally on the sprocket 72. The sprocket 72 has to this end an inwardly protruding portion which has a shoulder which comprises the friction face 722.

Axially between the friction faces 712 and 722, an annular-disk-like friction element 73 is arranged in a frictionally engaging manner.

At the side facing away from the friction face 722, an annular adjustment screw 74 is screwed into a coaxial inner thread 723 of the sprocket 72. The adjustment screw 74 has an axial friction face 741 which is axially opposite the friction face 713.

An annular, axially resilient element 75, for example, a helical spring, ondular washer or disk spring, or an O-ring formed from an elastomer material and a friction element 76 is arranged axially between the friction face 741 of the adjustment screw 74 and the friction face 713 of the hub element 71 and may be constructed in a similar manner to and substantially with the same function as the above-mentioned friction element 73.

The friction elements 73 and 76 each have outwardly protruding pins 731 and 761 which are preferably arranged in a state distributed in a uniform manner over the circumference of the friction elements 73 and 76. The sprocket 72 preferably has internal grooves 724 in which the pins 731 and 761 of the friction elements 73 and 76 engage and secure them with respect to the sprocket in a rotation direction about the spindle axis G. Consequently, the friction elements 73 and 76 cannot be rotated with respect to the sprocket 72 about the spindle axis G.

As a result of the adjustment screw 74, the friction element 76 is loaded via the resilient element 75 with a defined pretensioning force with respect to the friction face 713 of the hub element 71. At the same time, the hub element 71 is thereby pressed with the friction face 712 axially via the friction element 73 with the pretensioning force axially against the corresponding friction face 722 of the sprocket 77. As a result, the hub element 71 is coupled via the friction faces 712 and 713 to the corresponding friction faces 722 and 741 on the sprocket 72 in a frictionally engaging, that is to say, non-positive-locking manner. As a result of the cooperation described, the slip clutch 8 according to the invention, by means of which the torque discharged by the motor 55 is transmitted to the gear wheel 7 and the threaded spindle 52 is formed. The maximum torque can be adjusted by screwing in or unscrewing the adjustment nut 74, whereby the axial pretensioning force acting between the friction faces 712, 713, 722 and 741 can be adjusted.

LIST OF REFERENCE NUMERALS

1 Steering column
2 Carrier unit
21 Securing means
22, 23 Pivot bearing
3 Adjustment unit
31 Covering pipe
32 Steering spindle
33 Securing portion
34 Transmission element
4 Covering unit
41 Adjustment lever
42 Through-opening
5, 6 Adjustment drive
51, 61 Spindle nut
511 Inner thread
52, 62 Threaded spindle
53, 63 Bearing housing
54 Securing element
55, 65 Motor (drive motor)
56, 66 Worm
7 Gear wheel
71 Hub element
711 Projection
712 Friction face
713 Friction face
72 Sprocket
721 Tooth arrangement
722 Friction face
73, 76 Friction element
74 Adjustment screw
741 Friction face
75 Resilient element
8 Slip clutch
L Longitudinal axis
H Vertical direction
G Spindle axis (threaded spindle axis)

What is claimed is:
1. An adjustment drive for a motor vehicle, comprising:
a threaded spindle having an outer thread;
a spindle nut having an internal thread that directly engages with the outer thread of the threaded spindle; and
a drive unit that is coupled to the threaded spindle or the spindle nut such that the threaded spindle and the spindle nut are drivable in rotation relative to each other,
wherein the drive unit includes:
a drive motor coupled to the threaded spindle or the spindle nut by a worm and a worm gear; and
a torque-transmitting slip clutch that is integrated inside the worm gear and that is coupled to the threaded spindle or the spindle nut such that,
when a torque transmitted between the drive motor and either the threaded spindle or the spindle nut is below a threshold torque, a drive torque produced by the drive motor is transmitted between the drive motor and either the threaded spindle or the spindle nut by the torque-transmitting slip clutch and, when the torque transmitted between the drive motor and either the threaded spindle or the spindle nut reaches the threshold torque, the slip clutch limits the torque transmitted between the drive motor and either the threaded spindle or the spindle nut to the threshold torque by slipping;

wherein the slip clutch is arranged coaxially relative to the threaded spindle.

2. The adjustment drive of claim 1 wherein the slip clutch includes friction faces that contact each other in a frictionally engaging manner.

3. The adjustment drive of claim 2 wherein the slip clutch includes a pretensioning device.

4. The adjustment drive of claim 3 wherein the pretensioning device includes at least one of a resilient element or an adjustable adjustment means.

5. The adjustment drive of claim 1 wherein the torque-transmitting slip clutch is located radially inside of the worm gear.

6. The adjustment drive of claim 1 wherein the torque-transmitting slip clutch is located radially inside of teeth of the worm gear.

7. The adjustment drive of claim 1 wherein the worm gear has an internal cavity and the torque-transmitting slip clutch is within the internal cavity in the worm gear.

8. The adjustment drive of claim 1 wherein the torque-transmitting slip clutch is located radially between the worm gear and the threaded spindle.

9. An adjustment drive for a motor vehicle, comprising:
a threaded spindle having an outer thread;
a spindle nut having an internal thread that directly engages with the outer thread of the threaded spindle; and
a drive unit that is coupled to the threaded spindle or the spindle nut such that the threaded spindle and the spindle nut are drivable in rotation relative to each other,
wherein the drive unit includes:
a drive motor coupled to the threaded spindle or the spindle nut by a worm and a worm gear; and
a torque-transmitting slip clutch that is integrated inside the worm gear and that is coupled to the threaded spindle or the spindle nut such that,
when a torque transmitted between the drive motor and either the threaded spindle or the spindle nut is below a threshold torque, a drive torque produced by the drive motor is transmitted between the drive motor and either the threaded spindle or the spindle nut by the torque-transmitting slip clutch and,
when the torque transmitted between the drive motor and either the threaded spindle or the spindle nut reaches the threshold torque, the slip clutch limits the torque transmitted between the drive motor and either the threaded spindle or the spindle nut to the threshold torque by slipping;
wherein the torque-transmitting slip clutch is located radially inside of the worm gear.

10. The adjustment drive of claim 9 wherein the slip clutch includes friction faces that contact each other in a frictionally engaging manner.

11. The adjustment drive of claim 10 wherein the slip clutch includes a pretensioning device.

12. The adjustment drive of claim 11 wherein the pretensioning device includes at least one of a resilient element or an adjustable adjustment means.

13. An adjustment drive for a motor vehicle, comprising:
a threaded spindle having an outer thread;
a spindle nut having an internal thread that directly engages with the outer thread of the threaded spindle; and
a drive unit that is coupled to the threaded spindle or the spindle nut such that the threaded spindle and the spindle nut are drivable in rotation relative to each other,
wherein the drive unit includes:
a drive motor coupled to the threaded spindle or the spindle nut by a worm and a worm gear; and
a torque-transmitting slip clutch that is integrated inside the worm gear and that is coupled to the threaded spindle or the spindle nut such that,
when a torque transmitted between the drive motor and either the threaded spindle or the spindle nut is below a threshold torque, a drive torque produced by the drive motor is transmitted between the drive motor and either the threaded spindle or the spindle nut by the torque-transmitting slip clutch and,
when the torque transmitted between the drive motor and either the threaded spindle or the spindle nut reaches the threshold torque, the slip clutch limits the torque transmitted between the drive motor and either the threaded spindle or the spindle nut to the threshold torque by slipping;
wherein the worm gear has an internal cavity and the torque-transmitting slip clutch is within the internal cavity in the worm gear.

14. The adjustment drive of claim 13 wherein the slip clutch includes friction faces that contact each other in a frictionally engaging manner.

15. The adjustment drive of claim 14 wherein the slip clutch includes a pretensioning device.

16. The adjustment drive of claim 15 wherein the pretensioning device includes at least one of a resilient element or an adjustable adjustment means.

17. An adjustment drive for a motor vehicle, comprising:
a threaded spindle having an outer thread;
a spindle nut having an internal thread that directly engages with the outer thread of the threaded spindle; and
a drive unit that is coupled to the threaded spindle or the spindle nut such that the threaded spindle and the spindle nut are drivable in rotation relative to each other,
wherein the drive unit includes:
a drive motor coupled to the threaded spindle or the spindle nut by a worm and a worm gear; and
a torque-transmitting slip clutch that is integrated inside the worm gear and that is coupled to the threaded spindle or the spindle nut such that,
when a torque transmitted between the drive motor and either the threaded spindle or the spindle nut is below a threshold torque, a drive torque produced by the drive motor is transmitted between the drive motor and either the threaded spindle or the spindle nut by the torque-transmitting slip clutch and,
when the torque transmitted between the drive motor and either the threaded spindle or the spindle nut reaches the threshold torque, the slip clutch limits the torque transmitted between the drive motor and either the threaded spindle or the spindle nut to the threshold torque by slipping;

wherein the torque-transmitting slip clutch is located radially between the worm gear and the threaded spindle.

18. The adjustment drive of claim 17 wherein the slip clutch includes friction faces that contact each other in a frictionally engaging manner.

19. The adjustment drive of claim 18 wherein the slip clutch includes a pretensioning device.

20. The adjustment drive of claim 19 wherein the pretensioning device includes at least one of a resilient element or an adjustable adjustment means.

* * * * *